Dec. 14, 1948.  H. F. MALONE  2,456,291
TOASTER
Filed July 5, 1945  2 Sheets-Sheet 1
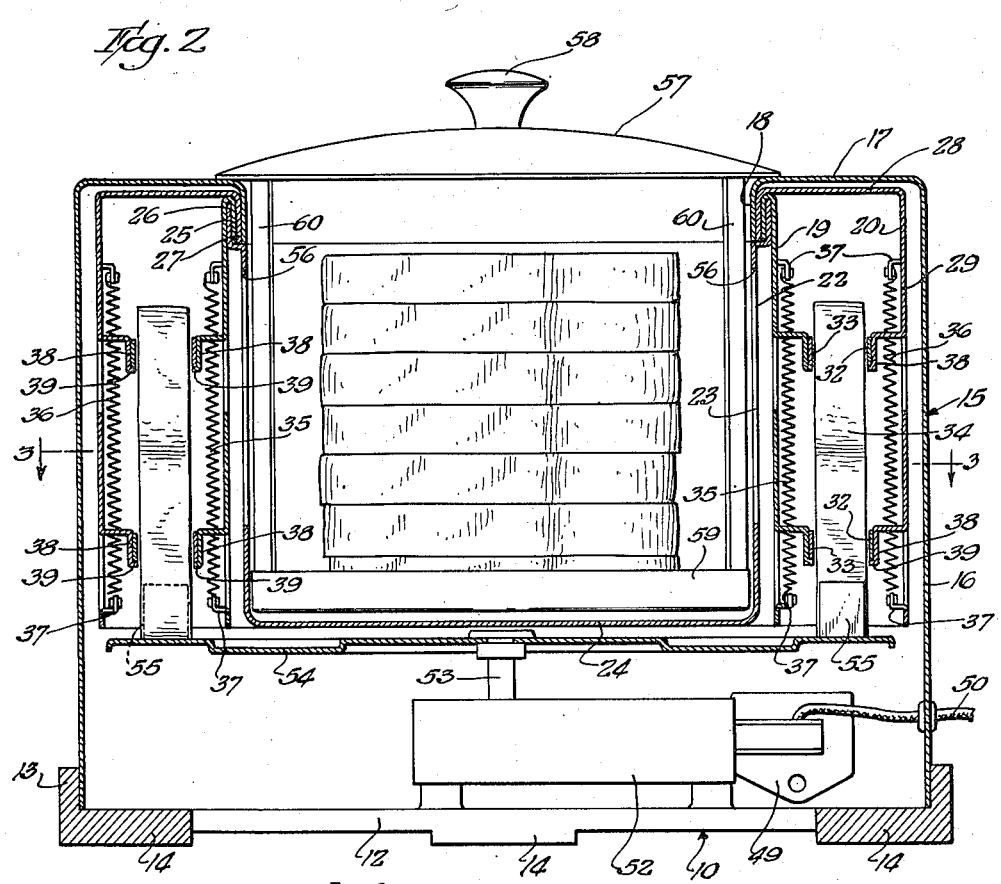
Inventor:
Homer F. Malone
By McCaleb, Wendt & Dickinson
Attys Dec. 14, 1948.   H. F. MALONE   2,456,291
TOASTER
Filed July 5, 1945   2 Sheets-Sheet 2

Inventor:
Homer F. Malone
By: McCaleb, Wendt & Dickinson
Attys.

Patented Dec. 14, 1948

2,456,291

UNITED STATES PATENT OFFICE 2,456,291

TOASTER

Homer F. Malone, Chicago, Ill., assignor of one-half to Frank D. Ross, Chicago, Ill.

Application July 5, 1945, Serial No. 603,316

4 Claims. (Cl. 99—339)

This invention relates generally to toasters, and more particularly to a toaster of the automatic type including a warming compartment for keeping a supply of prepared toast warm.

It is a general object of my present invention to provide an improved automatic toaster including a compartment heated by the toaster heating elements wherein a supply of prepared toast may be kept warm and easily accessible.

For another object the invention contemplates the provision of an improved toaster for bread and the like in which successive slices are automatically carried in a circular path in close proximity to heating elements for toasting during one cycle of movement through the path, while a warming well disposed centrally of the path is heated by the same heating elements.

Another object of this invention is to provide a toaster embodying a circular housing and a centrally disposed warming well, and the structure of which lends itself readily to the use of easily assembled parts made of preformed sheet metal.

The invention also has for an object the provision of an improved inexpensive automatic toaster in which several slices of bread or the like may be successively and simultaneously toasted.

As an additional object, the invention comprehends the provision in a compact toaster unit of an effective and handily disposed warming compartment.

Other objects and advantages of the invention will be apparent from the following description and the accompanying drawings, in which similar characters of reference indicate similar parts throughout the several views.

Referring to the drawings of which there are two sheets:

Fig. 1 is a front elevational view of a toaster embodying a preferred form of my present invention;

Fig. 2 is a side sectional view of the toaster shown in Fig. 1 drawn to a larger scale and having the section taken substantially on a line 2—2 of Fig. 3.

Figure 3:
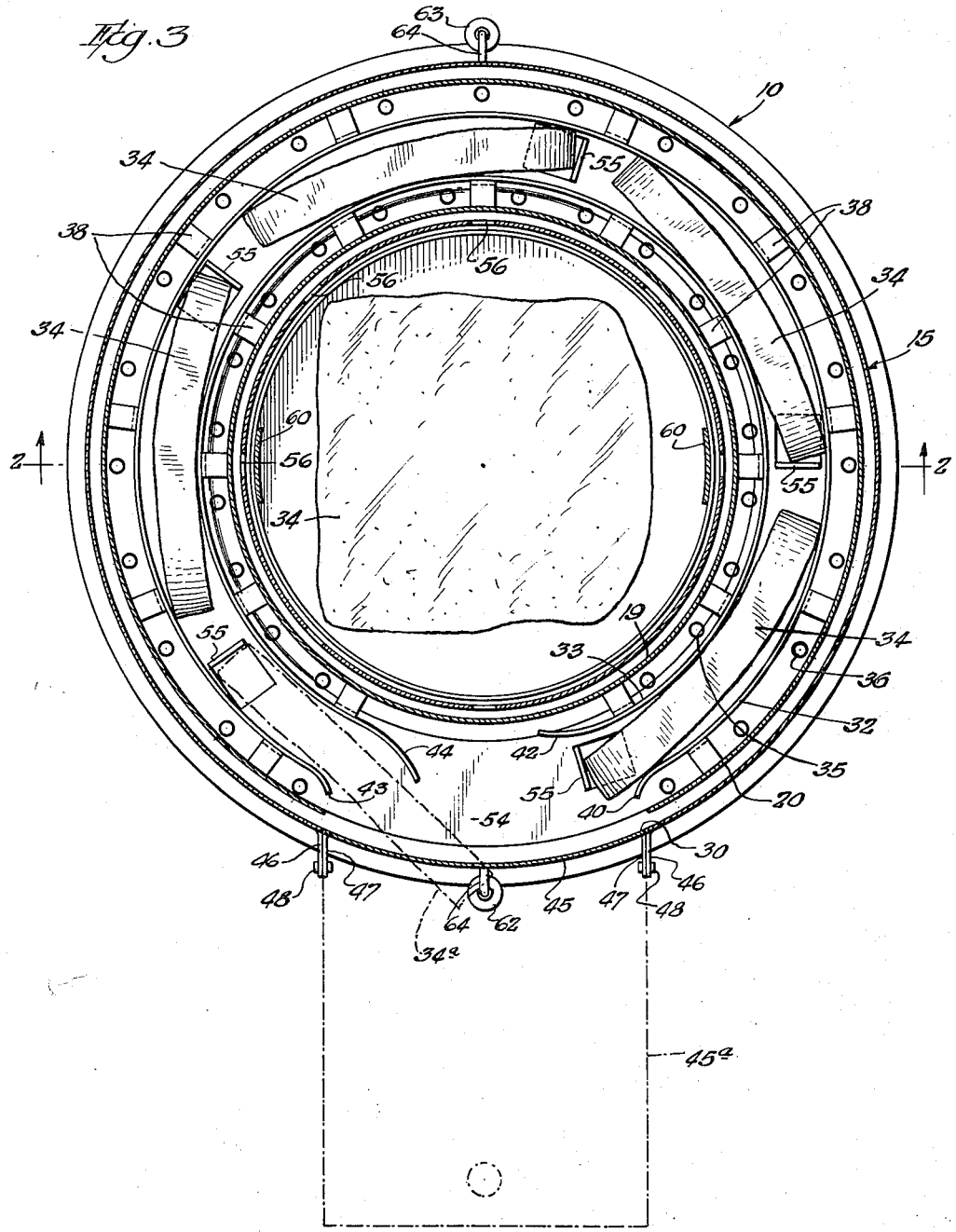
Fig. 3 is a top sectional view of the toaster shown in Fig. 2 with the section taken substantially on a line 3—3 of Fig. 2.

The exemplary embodiment of my toaster which is disclosed in the accompanying drawings includes a base 10 having a central opening 12, an upwardly projecting rim portion 13 and feet 14. By preference this base 10 is made of a molded insulating material such as phenol fiber or heat resistant plastic material.

Fitting into the rim portion 13 and secured to the base 10, is a housing 15 having a substantially cylindrical outer side wall 16 extending upwardly from the base. In my preferred construction, an inwardly projecting top portion 17 of the housing is formed integrally with the outer wall 16 and has at its inner edge a downwardly projecting integrally formed flange 18 which is uniformly spaced from the outer wall.

Secured to the flange 18 by suitable screws or by spot welding, are support members 19 and 20 and a warming well 22 having a side wall 23 and a bottom 24 which are integrally formed. In order to provide a firm and conveniently secured support for the support members 19 and 20 and the warming well 22 relative to the flange 18, an edge 25 of the inner support member 19 is folded over a flanged edge 26 on the side wall 23 of the warming well and a flanged edge 27 on the outer support member 20 fits within and extends over the surface provided by the folded edge 25 on the inner support member. This assembly fits over the flanged edge 18 of the housing intermediate that edge and the outer wall 16 so that all of the edges may be easily and conveniently secured together.

The support member 20 has a top portion 28 extending outwardly along the inner surface of the top portion 17 of the housing and a downwardly extending side portion 29 which is uniformly spaced from the inner surface of the housing wall 16. The support member 19 extends downwardly in uniformly spaced relationship relative to the support member 20. Peripherally the outer support member 20 terminates adjacent the sides of a door opening 30 in the outer wall 16. For convenience in manufacturing the inner support member 19 may encircle the warming well 22 as shown in Fig. 3 or it may terminate at positions radially inwardly of the ends of the outer support member 20. Radially the inner and outer support members 19 and 20 are separated by an amount sufficient to accommodate therebetween opposed pairs of guide strips 32 and 33 having space therebetween for the passage of a slice of bread as indicated at 34. The guide strips 32 and 33 are desirably spaced from adjacent surfaces of the support members 19 and 20 by an amount sufficient to accommodate resistance heating elements such as 35 and 36 in spaced relation to opposite sides of the slice of bread.

In my preferred construction lugs 37 are punched out of the opposed wall portions of the inner and outer support members 19 and 20 for supporting the resistance heating elements 35 and 36 at vertically separated positions such that the heated area substantially covers the vertical extent of the slice of bread. Both support members terminate at a distance from the inner surface of the base 10. Although other types of guide strips are feasible for supporting a slice of bread between and in spaced relation to the heating elements, my preferred construction utilizes relatively narrow flat metal strips supported by brackets 38 punched from the inner and outer support members. The brackets are disposed in peripheral and vertically spaced rows and each desirably has a projecting end portion 39 upon which the guide strips rest although the guide strips may be secured to the brackets 38 by means such as spot welding. They may also be formed to a size such that the normal tension of the strips holds them in place relative to the brackets and the flanged ends 39 thereon.

In the illustrated construction, the side wall 23 of the warming well 22 terminates at a distance from the inner surface of the base 10 but extends downwardly in spaced relationship with respect to the outer housing wall 16 to define between those walls a toasting chamber or compartment. As shown in Fig. 3, the guide strips 32 and 33 terminate near the opposite sides of the door opening 30. To facilitate the insertion of a slice of bread, the ends such as 40 and 42 of the guide strips 32 and 33 are bent away from one another at one side of the door opening. At the other side of the door opening it is preferred that the ends 43 and 44 of the guide strips are curved outwardly toward the door opening to facilitate the removal of the slice of toast.

In order to conserve heat during the toasting of one or more slices of bread such as 34, the opening 30 in the outer wall 16 of the housing is fitted with a door 45 which conforms to the contour of the housing and is supported at its bottom end by means such as hinge lugs 46 and 47 integrally formed on the outer wall 16 and the door 45 respectively, and rotatably connected by pins 48 for swinging movement of the door from a position flush with the outer wall 16 to an outwardly extending position such as that indicated at 45a in Fig. 3.

In order to effect automatic operation of the toaster, a motor 49 is adapted to be connected to a suitable source of power through wires 50 and is supported from the base 10 through a suitable speed reduction mechanism indicated generally at 52. A drive shaft 53 of the speed reducing mechanism is centrally disposed with respect to the housing 15 and extends upwardly to a position below the warming well 22. A substantially circular table 54 is supported by and drivingly connected to the shaft 53 and extends outwardly toward the housing wall 16 to a position below the space between the support members 19 and 20.

Toast pushing lugs 55 are punched upwardly from the table 54 at circumferentially spaced positions such that a slice of bread may be placed between each successive pair of lugs. In the disclosed embodiment of my invention the direction of rotation of the motor is such that the table is driven thereby in a counterclockwise direction as viewed in Fig. 3.

It is contemplated that suitable speed control means of a type well known in the electrical art may be provided to adjust the motor speed to a value such that each slice of bread is browned to the desired degree during its passage between the heating elements; that is, a slice of bread is inserted between the ends 40 and 42 of the guide strips 32 and 33 and upon the surface of the table 54 in front of one of the lugs 55. The rotation of the table which is effected by the motor 49 moves the slice of bread through the toasting channel between the heating elements until it emerges from between the ends 43 and 44 of the guide strips at a position such as that indicated in dot-and-dash lines at 34a in Fig. 3. Several slices of bread may be successively toasted at the same time by successively placing the slices in the toaster in front of an available one of the lugs 55 when that lug is in a position inside of the door opening 30.

The side wall 23 of the warming well 22 may have slots 56 therein at peripherally spaced positions for the passage of warm air from the heating elements 35 and 36 into the interior of the well. The interior of the well being warmed by the heating elements of the toaster, the heat is retained therein by a cover 57 having a handle 58 of heat insulating material. The cover 57 is adapted to rest against the top portion 17 of the housing adjacent the upper edge of the well. To facilitate the use of the warming well for maintaining a supply of warm toast and to make easy the removal and passing of the warm toast from the well, a tray is suspended from the cover 57 by support strips 60. So as normally to be supported by the cover at a position near the bottom of the well, this tray is of a size such that it is freely movable axially of the well upon movement of the cover as indicated in dot-and-dash lines designated at 57a, 58a and 60a in Fig. 1. If desired, the tray may be completely removed from the well for passing.

For lifting or moving the toaster when the heating elements and the outer wall are hot, handles 62 and 63 of a suitable heat insulating material are secured to opposite sides of the housing by brackets 64. One of the handles being on the door 45, it is utilized for opening and closing that door during the use of the toaster.

From the foregoing description of the structure and operation of the disclosed embodiment of my toaster, it may be understood that this toaster is adapted to automatic operation in that when the speed of the motor is properly adjusted, it toasts each slice of bread during its passage through the toasting channel. Both sides of the slice are toasted at once and several slices may be simultaneously and successively toasted at one time in a toaster of reasonably small size. Both the space and heat of the toaster are effectively and efficiently utilized in that the heat radiated from the heating elements warms the centrally disposed well to keep a supply of toast warm. The symmetrical and structural relationship of the parts is conservative of material.

Having thus illustrated and described my invention, what I claim as new and desire to secure by Letters Patent of the United States, is:

1. A toaster for bread or the like comprising, in combination, a base of insulating material, a rotary drive mechanism mounted on the base and having a centrally disposed drive shaft extending upwardly therefrom, a substantially circular table secured to the drive shaft to be supported and driven thereby, said table having a toast carrying platform with spaced and upstanding toast pushing lugs near the periphery thereof, a housing secured to the base and having a cylindrical outer wall extending upwardly from the base and spaced diametrically from said table, said housing also including an inwardly extending top portion and a centrally disposed well defined by a cylindrical wall spaced inwardly from said outer wall and a bottom wall spaced from said table, said cylindrical walls defining a circular toasting channel, a door opening in the outer wall fitted with a door and providing access to the toasting channel, support members adjacent and extending along each wall of the toasting channel in spaced relationship thereto and carried by the housing, said support members having means on the adjacent surfaces thereof carrying heating elements facing one another from opposite sides of the channel, said support members also carrying toast guide strips in spaced and substantially concentric relationship with the space therebetween substantially aligned with said platform and toast pushing lugs, said toast guide strips and the outer one of said support members each having an end adjacent opposite sides of said door opening and a cover for said well.

2. In a toaster for sliced bread or the like, the combination comprising a base, a housing secured to the base and having a substantially cylindrical side wall and a radially extending top portion, said housing also including a centrally disposed well defined by a substantially cylindrical inner wall extending downwardly from said top portion and an integral bottom wall, said cylindrical walls defining therebetween a toasting channel, said housing having an opening therein for access to the toasting channel, support members adjacent each wall of the toasting channel and carried by the housing in spaced relationship to the side wall and top portion of the housing, said support members having means on adjacent surfaces thereof carrying heating elements, said support members also including series of integrally formed and circumferentially spaced lugs thereon for carrying toast guide strips adapted to hold sliced bread in spaced relation to the heating elements, and means adapted to support sliced bread between said guide strips.

3. In a toaster for slices of bread and the like the combination comprising an outer housing member having an upright outer wall, a top portion disposed angularly relative to the outer wall and a downwardly extending flange on the edge of the top portion remote from the outer wall, a pair of support members each having portions extending downwardly in spaced relation along said outer wall and each being secured to and supported by said flange, heating elements carried by said support members, guide members also carried by said support members, and a movable bread support below the heating elements and aligned with the space between the support members.

4. In a toaster for slices of bread and the like, the combination comprising an outer housing having an upright outer wall, a top portion disposed angularly relative to the outer wall and a downwardly extending flange on the edge of the top portion remote from the outer wall, a pair of support members each having portions extending downwardly in spaced relationship along said outer wall and each being secured to and supported by said flange, heating elements carried by said support members, an inner container having a side wall smaller than said outer wall and a bottom, said side wall of the inner container having an offset flange portion on its upper edge, and at least one of said support members having a flange portion thereon, said flange on the top portion of the housing and said flange portions of the inner container and support member fitting together in overlapping relationship.

HOMER F. MALONE.

REFERENCES CITED

The following references are of record in the file of this patent:

UNITED STATES PATENTS

| Number | Name | Date |
|---|---|---|
| 403,446 | Reithoffer | May 14, 1889 |
| 1,349,529 | Pattison | Aug. 10, 1920 |
| 1,440,786 | Lyons | Jan. 2, 1923 |
| 1,524,532 | Biebel | Jan. 27, 1925 |
| 1,773,109 | McCaig et al. | Aug. 19, 1930 |
| 1,797,628 | Whiting | Mar. 24, 1931 |
| 1,836,538 | Lofgren et al. | Dec. 15, 1931 |
| 1,868,287 | Haeringer | July 19, 1932 |
| 1,971,012 | Macdonald | Aug. 21, 1934 |
| 2,059,911 | Rebora | Nov. 3, 1936 |
| 2,121,444 | Osrow | June 21, 1938 |
| 2,159,578 | Weinman | May 23, 1939 |